(12) United States Patent
Preisler et al.

(10) Patent No.: US 8,808,831 B2
(45) Date of Patent: *Aug. 19, 2014

(54) SANDWICH-TYPE, STRUCTURAL, COMPOSITE COMPONENT INCLUDING AT LEAST ONE HINGEDLY-CONNECTED PORTION, CARGO MANAGEMENT SYSTEM AND AUTOMOTIVE VEHICLE LOAD FLOOR UTILIZING THE COMPONENT

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/690,265

(22) Filed: Nov. 30, 2012

(65) Prior Publication Data
US 2013/0278003 A1    Oct. 24, 2013

Related U.S. Application Data

(63) Continuation-in-part of application No. 13/689,809, filed on Nov. 30, 2012, which is a continuation-in-part of application No. 13/688,972, filed on Nov. 29, 2012, application No. 13/690,265, which is a continuation-in-part of application No. 13/453,269, filed on Apr. 23, 2012.

(51) Int. Cl.
| | | |
|---|---|---|
| *B32B 3/08* | (2006.01) | |
| *B32B 5/14* | (2006.01) | |
| *B32B 3/12* | (2006.01) | |
| *B32B 3/26* | (2006.01) | |
| *B29C 43/00* | (2006.01) | |
| *B60R 5/04* | (2006.01) | |
| *B60R 5/00* | (2006.01) | |
| *A47G 27/02* | (2006.01) | |

(52) U.S. Cl.
CPC ... *B60R 5/00* (2013.01); *B32B 3/12* (2013.01); *B32B 3/263* (2013.01); *B29C 43/00* (2013.01); *B60R 5/04* (2013.01); *A47G 27/02* (2013.01)
USPC .......... 428/99; 296/39.1; 296/39.2; 296/39.3; 296/97.23; 428/95; 428/98; 428/116

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| | | |
|---|---|---|
| 5,298,694 A | 3/1994 | Thompson et al. |
| 5,502,930 A | 4/1996 | Burkette et al. |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A sandwich-type, structural, composite component including at least one hingedly connected portion which pivots with reduced or eliminated hinge binding and a cargo management system and vehicle load floor utilizing the component are provided. Elongated first and second interior portions of the component are locally crushed by the press molding to form a living hinge having a pivot axis and an elongated depression, respectively. The component includes an elongated cut-out which extends completely through the component at the elongated depression to obtain a clearance between a first portion of the component hingedly connected to a second portion of the component by the living hinge. The living hinge and the clearance allow pivotal movement of the first portion between different use positions relative to the second portion with reduced or eliminated hinge binding during the pivotal movement about the pivot axis.

21 Claims, 4 Drawing Sheets

(56) References Cited

U.S. PATENT DOCUMENTS

| | | | |
|---|---|---|---|
| 5,915,445 A | 6/1999 | Rauenbusch | |
| 5,979,962 A | 11/1999 | Valentin et al. | |
| 6,050,630 A | 4/2000 | Hochet | |
| 6,102,464 A | 8/2000 | Schneider et al. | |
| 6,435,577 B1 | 8/2002 | Renault | |
| 6,537,413 B1 | 3/2003 | Hochet et al. | |
| 6,631,785 B2 | 10/2003 | Khambete et al. | |
| 6,655,299 B2 | 12/2003 | Preisler et al. | |
| 6,659,223 B2 | 12/2003 | Allison et al. | |
| 6,682,675 B1 | 1/2004 | Vandangeot et al. | |
| 6,682,676 B1 | 1/2004 | Renault et al. | |
| 6,748,876 B2 | 6/2004 | Preisler et al. | |
| 6,790,026 B2 | 9/2004 | Vandangeot et al. | |
| 6,793,747 B2 | 9/2004 | North et al. | |
| 6,823,803 B2 | 11/2004 | Preisler | |
| 6,843,525 B2 | 1/2005 | Preisler | |
| 6,890,023 B2 | 5/2005 | Preisler et al. | |
| 6,918,625 B2 | 7/2005 | Storto et al. | |
| 6,981,863 B2 | 1/2006 | Renault et al. | |
| 7,014,259 B2 | 3/2006 | Heholt | |
| 7,059,646 B1 | 6/2006 | DeLong et al. | |
| 7,090,274 B1 | 8/2006 | Khan et al. | |
| 7,093,879 B2 | 8/2006 | Putt et al. | |
| 7,264,685 B2 | 9/2007 | Katz et al. | |
| 7,320,739 B2 | 1/2008 | Thompson, Jr. et al. | |
| 7,322,629 B2 | 1/2008 | McClintock | |
| 7,402,537 B1 | 7/2008 | Lenda et al. | |
| 7,419,713 B2 | 9/2008 | Wilkens et al. | |
| 7,748,775 B2 | 7/2010 | Mercurio | |
| 7,837,009 B2 | 11/2010 | Gross et al. | |
| 7,909,379 B2 | 3/2011 | Winget et al. | |
| 7,918,313 B2 | 4/2011 | Gross et al. | |
| 7,919,031 B2 | 4/2011 | Winget et al. | |
| 8,117,972 B2 | 2/2012 | Winget et al. | |
| 8,622,456 B2 | 1/2014 | Preisler et al. | |
| 8,690,233 B2 | 4/2014 | Preisler et al. | |
| 2005/0189674 A1 | 9/2005 | Hochet et al. | |
| 2006/0255611 A1 | 11/2006 | Smith et al. | |
| 2008/0105866 A1 | 5/2008 | Jeong et al. | |
| 2008/0145635 A1 | 6/2008 | Stoll et al. | |
| 2010/0026031 A1 | 2/2010 | Jouraku | |
| 2011/0315310 A1 | 12/2011 | Trevisan et al. | |
| 2013/0278002 A1 | 10/2013 | Preisler et al. | |
| 2013/0278003 A1 | 10/2013 | Preisler et al. | |
| 2013/0278009 A1 | 10/2013 | Preisler et al. | |
| 2013/0278015 A1 | 10/2013 | Preisler et al. | |
| 2013/0278018 A1 | 10/2013 | Preisler et al. | |
| 2013/0278019 A1* | 10/2013 | Preisler et al. | 296/193.07 |
| 2013/0278020 A1 | 10/2013 | Preisler et al. | |
| 2013/0280469 A1 | 10/2013 | Preisler et al. | |
| 2013/0280472 A1 | 10/2013 | Preisler et al. | |
| 2013/0280473 A1* | 10/2013 | Preisler et al. | 428/95 |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/686,362; date of mailing Mar. 25, 2014.

Office Action; related U.S. Appl. No. 13/523,253; date of mailing Mar. 25, 2014.

Office Action; related U.S. Appl. No. 13/688,972; date of mailing Mar. 28, 2014.

Office Action; related U.S. Appl. No. 13/687,232; date of mailing Mar. 28, 2014.

Office Action; related U.S. Appl. No. 13/689,809; date of mailing Mar. 31, 2014.

Office Action; related U.S. Appl. No. 13/687,213; date of mailing Mar. 31, 2014.

Office Action; related U.S. Appl. No. 13/690,265; date of mailing Mar. 31, 2014.

Office Action; related U.S. Appl. No. 13/762,904; date of mailing Apr. 8, 2014.

Office Action; related U.S. Appl. No. 13/762,800; date of mailing Apr. 8, 2014.

Office Action; related U.S. Appl. No. 13/762,861; date of mailing Apr. 9, 2014.

Office Action; related U.S. Appl. No. 13/690,566; date of mailing Apr. 9, 2014.

Office Action; related U.S. Appl. No. 13/762,832; date of mailing Apr. 11, 2014.

Office Action; related U.S. Appl. No. 13/762,921; date of mailing Apr. 14, 2014.

Notice of Allowance; related U.S. Appl. No. 13/686,388; date of mailing Apr. 15, 2014.

Related U.S. Appl. No. 13/690,566, filed Nov. 30, 2012.

Related U.S. Appl. No. 13/762,921, filed Feb. 8, 2013.

Related U.S. Appl. No. 13/762,956, filed Feb. 8, 2013.

Office Action; related U.S. Appl. No. 13/453,201 (now USPN 8,690,233); date of mailing Nov. 20, 2013.

Office Action; related U.S. Appl. No. 13/523,209 (now USPN 8,622,456) date of mailing Apr. 29, 2013.

Office Action; corresponding U.S. Appl. No. 13/688,972; date of mailing Mar. 28, 2014.

* cited by examiner

SANDWICH-TYPE, STRUCTURAL, COMPOSITE COMPONENT INCLUDING AT LEAST ONE HINGEDLY-CONNECTED PORTION, CARGO MANAGEMENT SYSTEM AND AUTOMOTIVE VEHICLE LOAD FLOOR UTILIZING THE COMPONENT

CROSS-REFERENCE TO RELATED APPLICATIONS

This application is a continuation-in-part of U.S. patent application entitled "Sandwich-Type, Structural, Composite Component Having a Cut-Out Feature With a Substantially Hidden Core, Assembly Utilizing Same and Panel For Use in a Vehicle Load Floor Assembly" filed Nov. 30, 2012 and having U.S. Ser. No. 13/689,809. U.S. Ser. No. 13/689,809 is a continuation-in-part of both U.S. patent applications entitled "Assembly Including a Compression-Molded Composite Component Having a Sandwich Structure and a Unitarily Connected Second Component" filed Nov. 29, 2012 having U.S. Ser. No. 13/688,972 and U.S. patent application entitled "Method of Making a Sandwich-Type Composite Panel Having a Living Hinge and Panel Obtained by Performing the Method" filed Apr. 23, 2012 and having U.S. Ser. No. 13/453,269, both of which are incorporated by reference herein in their entirety.

TECHNICAL FIELD

This invention relates in general to sandwich-type, structural, composite components and, in particular to, such components which have at least one hingedly-connected portion and cargo management systems and vehicle load floors utilizing same.

Overview

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges typically are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and cost of the finished parts.

In addition, the fact that separate external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,843,525; 6,890,023; 6,981,863; 7,014,259; 7,059,646; 7,090,274; 7,093,879; 7,264,685; 7,320,739, 7,322,629; 7,402,537, 7,419,713; 7,748,775; 7,837,009; 7,909,379; 7,918,313; 7,919,031; 8,117,972; 2006/0255611; 2008/0185866; 2010/0127529; and 2011/0315310.

One problem associated with prior art assemblies having such panels as load floors in the automotive industry is that the assemblies typically require many assembly steps often involving costly labor which adds to the cost and time of assembly manufacture. Also, some of the materials making up such assemblies are often non-recyclable.

Some panel assemblies such as load floor assemblies have components which are pivotable with metal hinges. However, such hinges are often unsightly and heavy and the components are difficult and unwieldy to pivot with a single hand.

One problem associated with resilient or living hinges of the prior art panels is that the panels are quite strong but the living hinges may not be strong enough during extended use. Also, if made from thermoplastic, it is difficult to use the hinge for applications involving high loads; although no immediate ill-effects may be evident, thermoplastics, due to their viscoelastic nature, all show "creep" or "cold-flow" upon long term application of high loads. Also, due to dimensional stack up issues hinge binding can result.

SUMMARY OF EXAMPLE EMBODIMENTS

An object of at least one embodiment of the present invention is to provide low-cost, light-weight and strong sandwich-type composite panels or components having living hinges which are strong enough so they function properly during extended use involving high loads without the need for additional materials or additional post processing steps.

Another object of at least one embodiment of the present invention is to provide a cargo management system and vehicle load floor including such a component which is lightweight, and aesthetically pleasing wherein a hinged portion of the component is capable of withstanding repeated cyclic loading with reduced or eliminated hinge binding.

In carrying out the above objects and other objects of at least one embodiment of the present invention, a sandwich-type, structural, composite component including at least one hingedly connected portion which pivots with reduced or eliminated hinge binding is provided. The component includes first and second outer layers and a core positioned between the outer layers and having a large number of cavities. The outer layers are bonded to the core by press molding. Elongated first and second interior portions of the component are locally crushed by the press molding to form a living hinge having a pivot axis and an elongated depression, respectively. The component also includes an elongated cut-out which extends completely through the component at the elongated depression to obtain a clearance between a first portion of the component hingedly connected to a second portion of the component by the living hinge. The living hinge and the clearance allow pivotal movement of the first portion between different use positions relative to the second portion with reduced or eliminated hinge binding during the pivotal movement about the pivot axis.

The clearance may extend from an outer edge of the first portion to the living hinge in a direction substantially perpendicular to the pivot axis.

The component may at least partially define a vehicle load floor wherein the first portion of the component is a hingedly connected close-out panel of the vehicle.

The clearance may extend from one end of the living hinge to an opposite end of the living hinge wherein the clearance and the living hinge form a substantially closed loop.

The first portion of the component may be a hingedly connected lid.

The component may at least partially define a vehicle load floor which divides a cargo compartment into upper and lower storage areas. The lid allows access to the lower storage area in an open position of the lid.

The component may further include an upper carpet layer bonded to an upper surface of the first outer layer by the press molding.

The component may further include a lower carpet layer bonded to a lower surface of the second outer layer by the press molding.

The component may further include a thermoplastic covering layer for covering the first outer layer. The covering layer may be a resin carpet and the resin may be polypropylene.

The core may be a cellular core such as a honeycomb core.

Each of the first and second outer layers may be fiber-reinforced.

The first and second outer layers may be reinforced thermoplastic outer layers. The core may be a thermoplastic cellular core. The thermoplastic of the outer layers and the core may be polypropylene.

The component may have a thickness in the range of 5 to 25 mm.

At least one of the outer layers may be a woven outer layer. At least one of the outer layers may be a woven polypropylene outer layer.

Further in carrying out the above objects and other objects of at least one embodiment of the present invention, a cargo management system is provided. The system includes at least one sandwich-type, structural, composite component having at least one hingedly connected portion which pivots with reduced or eliminated hinge binding. Each component includes first and second outer layers and a core positioned between the outer layers and having a large number of cavities. The outer layers are bonded to the core by press molding. Elongated first and second interior portions of the component are locally crushed by the press molding to form a living hinge having a pivot axis and an elongated depression, respectively. Each component also includes an elongated cut-out which extends completely through the component at the elongated depression to obtain a clearance between a first portion of the component hingedly connected to a second portion of the component by the living hinge. The living hinge and the clearance allow pivotal movement of the first portion between different use positions relative to the second portion with reduced or eliminated hinge binding during the pivotal movement about the pivot axis.

Still further in carrying out the above objects and other objects of at least one embodiment of the present invention, an automotive vehicle load floor is provided. The floor includes at least one sandwich-type, structural, composite component having at least one hingedly connected portion which pivots with reduced or eliminated hinge binding. Each component includes first and second outer layers and a core positioned between the outer layers and having a large number of cavities. The outer layers are bonded to the core by press molding. Elongated first and second interior portions of the component are locally crushed by the press molding to form a living hinge having a pivot axis and an elongated depression, respectively. Each component also includes an elongated cut-out which extends completely through the component at the elongated depression to obtain a clearance between a first portion of the component hingedly connected to a second portion of the component by the living hinge. The living hinge and the clearance allow pivotal movement of the first portion between different use positions relative to the second portion with reduced or eliminated hinge binding during the pivotal movement about the pivot axis.

Other technical advantages will be readily apparent to one skilled in the art from the following figures, description and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
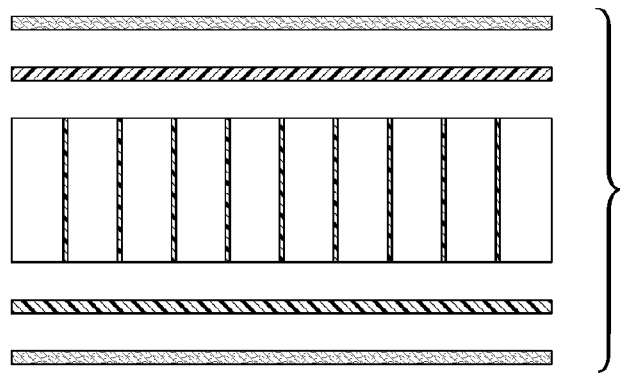
FIG. 1 is a side sectional view showing various separate layers of a prior art stack of thermoplastic-based layers of material.
Figure 2:
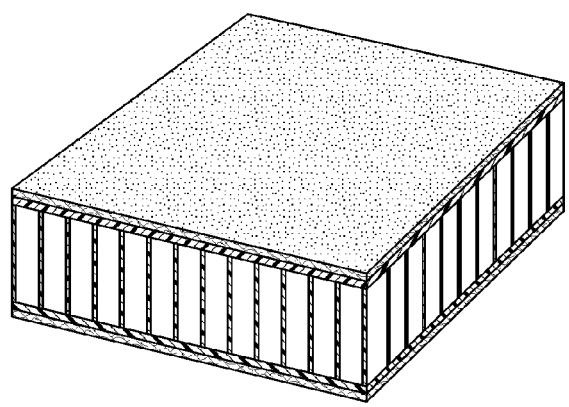
FIG. 2 is a top perspective sectional view, of the stack of FIG. 1 after low-pressure, cold compression molding.
Figure 3:
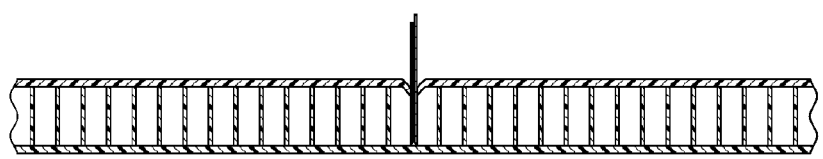
FIGS. 3 and 4 are side views, partially broken away and in cross section, of a prior art sandwich-type composite panel or component having a living hinge and method of making the living hinge.
Figure 4:
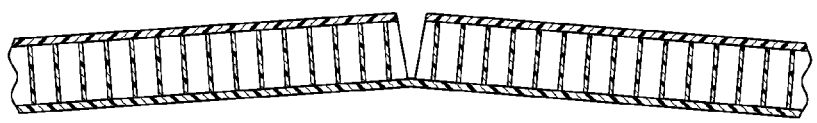
Figure 5:
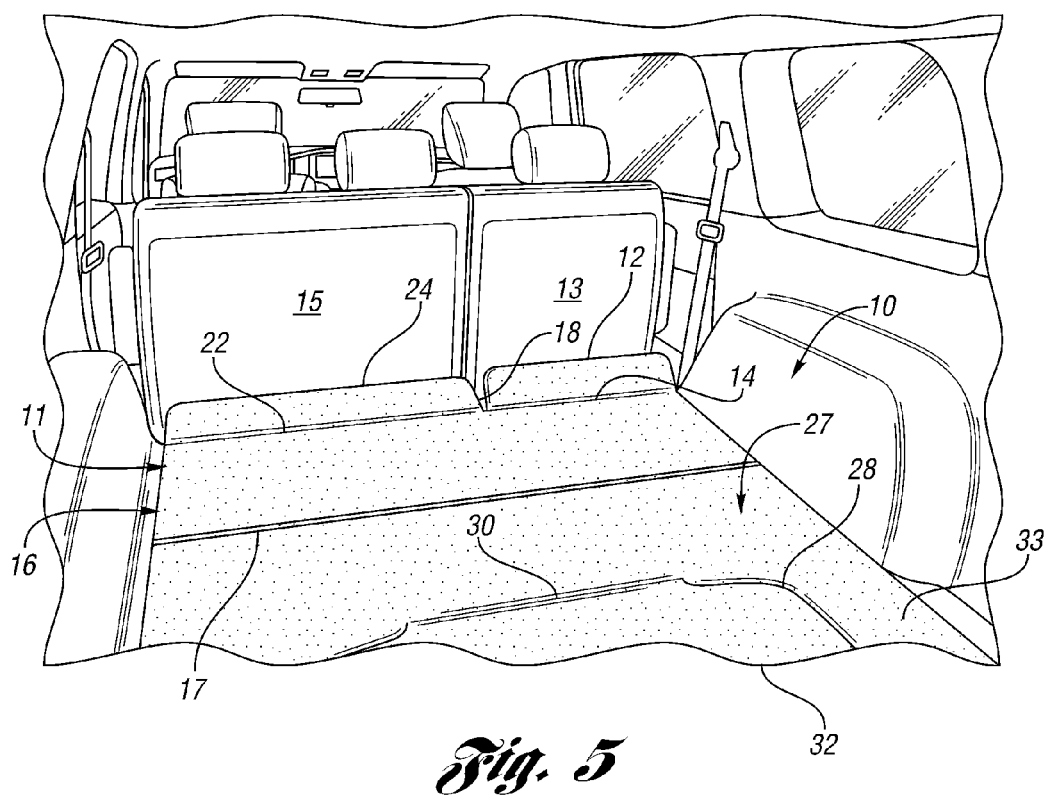
FIG. 5 is an environmental view, partially broken away, showing a vehicle load floor including a pair of carpeted sandwich-type composite panels or components, each of which has at least one living hinge and a clearance constructed in accordance with at least one embodiment of the present invention.
Figure 6:
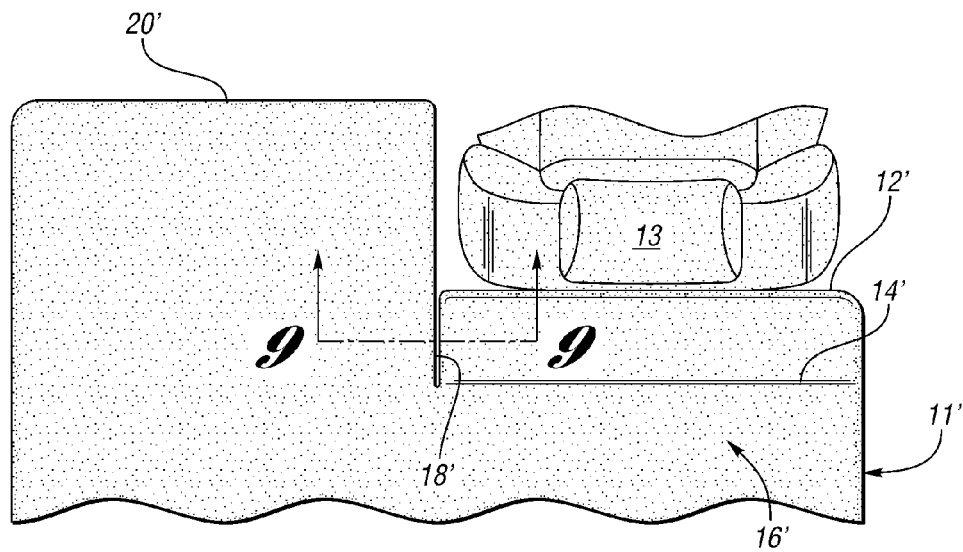
FIG. 6 is a top plan view, partially broken away, of a component of a vehicle load floor with a single, hingedly-connected, close-out panel and a clearance constructed in accordance with at least one embodiment of the present invention.
Figure 7:
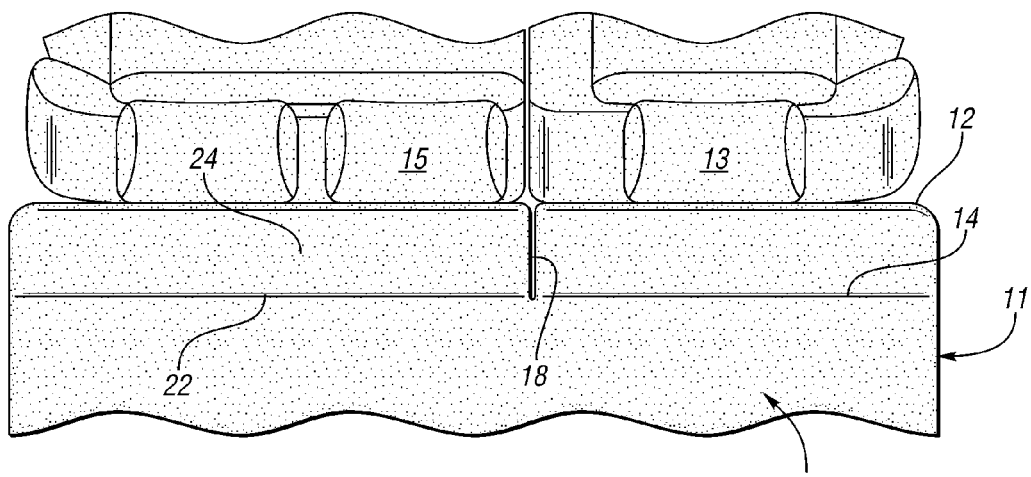
FIG. 7 is a view similar to the view of FIG. 6 but having a pair of close-out panels and a clearance therebetween as shown in FIG. 5 and constructed in accordance with at least an embodiment of the present invention.
Figure 8:
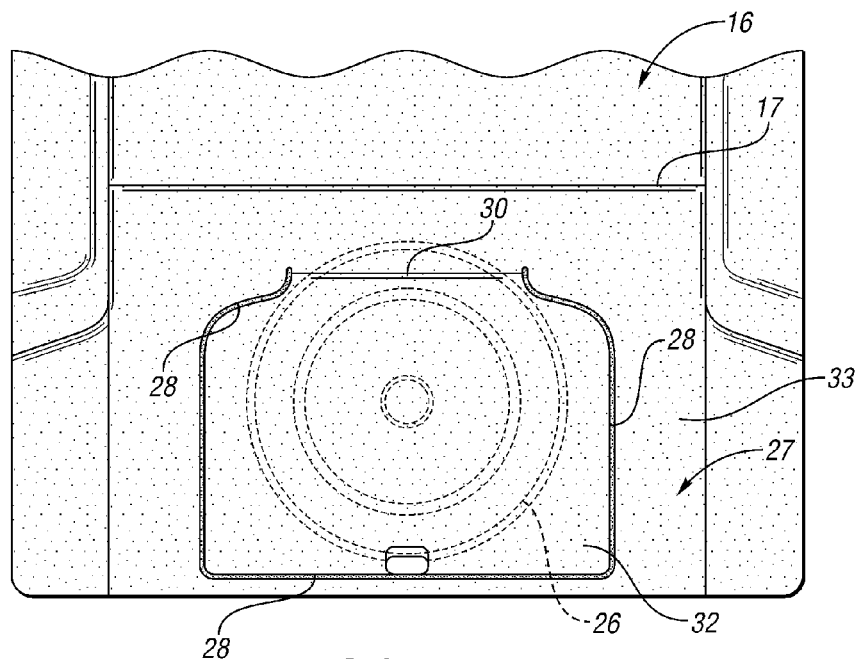
FIG. 8 is a top plan view, partially broken away, of a component of the vehicle load floor of FIG. 5 with a hingedly connected lid and a clearance between the lid and the rest of the component; the lid allows access to a lower storage area below the floor in an open position of the lid.
Figure 9:
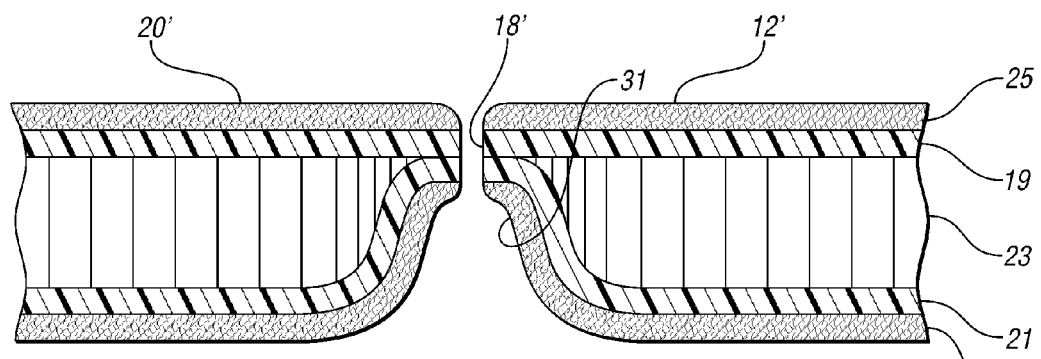
FIG. 9 is a view, partially broken away and in cross section, taken along lines 9-9 of FIG. 6 and showing the clearance between the close-out panel and the rest of the component.

Referring now to FIGS. 5-9, different embodiments of a cargo management system including an automotive vehicle load floor, generally indicated at 10 in FIG. 5, are shown. The load floor 10 typically includes at least one carpeted, compression-molded, sandwich-type, composite, hinged component or panel, generally indicated at 11 and 27 (FIGS. 5, 7 and 8) or 11' (FIGS. 6 and 9).

For example, the panel 11 includes panel portions 12, 16 and 24. A living hinge 14 pivotally connects the panel portions 12 and 16, a living hinge 22 pivotally connects the portions 16 and 24 and a living hinge 17 pivotally connects the panel portion 16 and the panel 27. The panel portions 12 and 24 may operate as close-out panels against vehicle seats 13 and 15, respectively. However, it is to be understood that one or more hinged panels or components constructed in accordance with at least one embodiment of the present invention may be used in a wide variety of environments besides the automotive vehicle environment of FIG. 5.

The carpeted, compression-molded, sandwich-type, composite hinged panel 27 (FIGS. 5 and 8) includes panel portions 32 and 33. A living hinge 30 hingedly connects the portions 32 and 33. The panel portion 32 may operate as a lid for covering a spare tire, indicated in phantom at 26 in FIG. 8, in a closed position of the lid 32 and for allowing access to the tire 26 in its open position.

Referring now to FIG. 6, the floor 10 of the system may include a carpeted compression-molded, sandwich-type, composite hinged panel, generally included at 11', instead of the hinged panel 11 of FIGS. 5 and 7, when only a single panel portion 12' or close-out panel is required. The panel portion 12' is hingedly connected to a panel portion 16' by a living hinge 14'. The panel portion 16' includes a stationary part or portion 20' if a second close-out panel like the close-out panel 24 of FIGS. 5 and 7 is neither desired nor required.

In each embodiment of the invention described above, each sandwich-type, structural, composite component 11, 11' or 27 includes at least one, and possibly two (FIGS. 5 and 7), hingedly connected portions 12, 24, and 32 which pivot with reduced or eliminated hinge binding. Each component 11, 11' or 27 includes (FIG. 9) first and second outer layers 19 and 21, respectively, and a core 23 positioned between the outer layers 19 and 21 and having a large number of cavities. The outer layers 19 and 21 are bonded to the core 23 by press molding. Elongated first and second interior portions of each component 11, 11' or 27 are locally crushed by the press molding to form one or more living hinges 14 and 22 (FIGS. 5 and 7), 14' (FIG. 6) or 30 (FIGS. 5 and 8) having a pivot axis and an elongated depression 31, (which is subsequently cut-out as shown in FIG. 9) respectively.

Each component 11, 11' or 27 also includes an elongated cut-out 18' (FIGS. 6 and 9), 18 (FIGS. 5 and 7), or 28 (FIGS. 5 and 8) which extends completely through the component 11, 11' or 27 at the elongated depression 31 to form a clearance between the portion 12, 12', 24, or 32 of the component hingedly connected to its respective portion 16, 16' or 33 of the component by its respective living hinge 14, 14', 22 or 30. The living hinge 14, 14', 22 or 30 and its respective clearance allow pivotal movement of the portion 12, 12', 24 or 32 between different use positions relative to its respective portion 16, 16' or 33 with reduced or eliminated hinge binding during the pivotal movement about the pivot axis.

In the embodiments of FIGS. 5-9, the clearance provided by the cut-out 18 or 18' extends from an outer edge of the portion 12 or 12', respectively, to its respective living hinge 14 or 14' in a direction substantially perpendicular to the pivot axis of the living hinge 14 or 14', respectively.

In the embodiment of FIG. 8 the clearance provided by the cut-out 28 extends from one end of the living hinge 30 to an opposite end of the living hinge 30 wherein the clearance provided by the cut-out 28 and the living hinge 30 form a substantially closed loop.

An upper carpet layer 25 (FIG. 9) is typically bonded to an upper surface of the first outer layer 19 by the press molding. Also, a lower carpet layer 29 (FIG. 9) may be bonded to a lower surface of the second outer layer 21 by the press molding.

Each hinged panel 11, 11' or 27 is typically manufactured by providing a stack of material located or positioned within a mold. The stack includes the first and second reinforced thermoplastic skins or outer layers 19 and 21, respectively, a core having a large number of cavities such as a thermoplastic cellular core 23 disposed between and bonded to the skins 19 and 21 by the press molding. Substantially continuous covering or carpet layers 25 and 29 made of thermoplastics material covers and is bonded to the first and second skins 19 and 29, respectively, provide top and bottom carpeted surfaces. The skins 19 and 21 are heated typically outside of the mold to a softening temperature. The mold is preferably a low-pressure, compression mold which performs a thermo-compression process on the stack of materials.

The carpet layers 25 and 29 may be resin carpets and the resin may be polypropylene. The carpet layers 25 and 29 may be made of a woven or nonwoven material (typically of the carpet type).

The cellular core 23 may be a honeycomb core. In this example, the cellular core 23 has an open-celled structure of the type made up of tubes or a honeycomb, and it is made mainly of polyolefin and preferably of polypropylene. It is also possible to use a cellular structure having closed cells of the foam type.

Each of the skins 19 and 21 may be fiber reinforced. The thermoplastic of the skins 19 and 21, the covering layers 25 and 29 and the core 23 may be polypropylene. At least one of the skins 19 and 21 may be a woven skin, such as a woven polypropylene skin. Each of the skins 19 and 21 may be reinforced with fibers, e.g., glass fibers, carbon fibers or natural fibers. At least one of the skins 19 and 21 may advantageously be made up of woven glass fiber fabric and of a thermoplastics material.

The core 23 corresponding to each panel portion may have a thickness in the range of 3 to 25 mm.

In one example method of making the hinged panels 11, 11' and 27, stacks of material may be pressed in a low pressure, cold-forming mold. The stack is made up of the first skin 19, the cellular core 23, the second skin 21, and the covering layers 25 and 29, and is pressed at a pressure lying in the range of $10 \times 10^5$ Pa. to $30 \times 10^5$ Pa. The first and second skins 19 and 21 are preferably pre-heated to make them malleable and stretchable. Advantageously, in order to soften the first and second skins 19 and 21, respectively, heat is applied to a pre-assembly constituted by the stack made up of at least the first skin 19, of the cellular core 23, and the second skin 21. The first and second skins 19 and 21 have a forming temperature lying approximately in the range of 160° C. to 200° C., and, in this example, about 180° C. The living hinges 14, 22, 30 and 14' may be formed by performing the method of the above-noted patent application entitled "Method of Making a Sandwich Type Composite Panel Having a Living Hinge and Panel Obtained by Performing the Method."

The mold typically has an upper mold half or part and a lower mold half or part. The lower mold part typically has one or more protrusions extending towards the upper mold half for crushing purposes in forming depressions for the living hinges 14, 22, 30 and 14' and the lower depression 31 (FIG. 9) as described in detail below. The upper mold half may also have one or more protrusions which extend towards the lower mold part for crushing purposes in forming an upper depression (not shown).

The first and second skins 19 and 21, respectively, are stretchable when heated to the softening temperature and stretch when a pressure is applied to the stack by the inner mold surfaces of the mold halves of the mold including the outer surface of the protrusions within the mold to form the composite panel 11, 11' or 27 with the living hinges 14, 22, 30 and 14' and a lower surface depression such as the depression 31 (FIG. 9). One or more portions of the composite panel 11, 11' or 27 are crushed at one or more predetermined locations simultaneously with the step of applying the pressure to locally compact and separate the cellular core 23 at the one or more predetermined locations to form two side portions of the panel 11, 11' or 27 and the crushed portions (for example at the living hinges 14, 22, 30 and 14' and the depression 31) therebetween. The first skin 19 may typically stretch during the step of crushing while remaining intact between the two side portions of the panel 11, 11' or 27. The first and second skins 19 and 21, respectively, of the crushed portion may be chemically bonded together (FIG. 9) to form the elongated depression 31 at the predetermined location between the two side portions of the panels 11, 11' or 27.

The protrusion or protrusions of the mold may have various shapes in cross section in order for the mold to perform the crushing step during the pressure application step.

After the crushing step, the elongated cut-out, or cut-out feature 18, 18' or 28 is formed such as by cutting completely through the panels 11, 11' or 27, respectively, at the depressions such as the depression 31. The elongated cut-out 18, 18' or 28 extends completely through its respective component 11, 11' or 27 at an interior portion of the component 11, 11' or 27 wherein the bonded skins 19 and 21 substantially hide the core 23 at the cut-out 18 or 18' or 28 without compromising the structural integrity of the component 11, 11' or 27, respectively.

As shown in FIG. 8, the crushed interior portion which forms the depression (which is later cut-out to form the cut-out 28 for the clearance) may be completely enclosed by the rest of the component 27. However, it is to be understood that the crushed interior portion need not be completely enclosed by the rest of the panel as shown in FIGS. 5-7.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sandwich-type, structural, composite component including at least one hingedly connected portion which pivots with reduced or eliminated hinge binding, the component comprising:

first and second outer layers and a core positioned between the first and second outer layers and having a plurality of cavities, wherein the first and second outer layers are bonded to the core by press molding and wherein elongated first and second interior portions of the component are locally crushed by the press molding to form a living hinge having a pivot axis and an elongated depression, respectively; and an elongated cut-out which extends completely through the component at the elongated depression to obtain a clearance between a first portion of the component hingedly connected to a second portion of the component by the living hinge wherein the living hinge and the clearance allow pivotal movement of the first portion between different use positions relative to the second portion with reduced or eliminated hinge binding during the pivotal movement about the pivot axis.

2. The component as claimed in claim 1, wherein the clearance extends from an outer edge of the first portion to the living hinge in a direction substantially perpendicular to the pivot axis.

3. The component as claimed in claim 2, wherein the component at least partially defines a vehicle load floor and wherein the first portion of the component is a hingedly connected close-out panel.

4. The component as claim in claim 1, wherein the clearance extends from one end of the living hinge to an opposite end of the living hinge and wherein the clearance and the living hinge form a substantially closed loop.

5. The component as claimed in claim 4, wherein the first portion of the component is a hingedly connected lid.

6. The component as claimed in claim 5, wherein the component at least partially defines a vehicle load floor which divides a cargo compartment into upper and lower storage areas, and wherein the lid allows access to the lower storage area in an open position of the lid.

7. The component as claimed in claim 1, further comprising an upper carpet layer bonded to an upper surface of the first outer layer by the press molding.

8. The component as claimed in claim 7, further comprising a lower carpet layer bonded to a lower surface of the second outer layer by the press molding.

9. The component as claimed in claim 1, further comprising a thermoplastic covering layer for covering the first outer layer.

10. The component as claimed in claim 9, wherein the covering layer is a resin carpet.

11. The component as claimed in claim 10, wherein the resin is polypropylene.

12. The component as claimed in claim 1, wherein the core is a cellular core.

13. The component as claimed in claim 12, wherein the cellular core is a honeycomb core.

14. The component as claimed in claim 1, wherein each of the first and second outer layers is fiber-reinforced.

15. The component as claimed in claim 1, wherein the first and second outer layers are reinforced thermoplastic outer layers and wherein the core is a thermoplastic cellular core.

16. The component as claimed in claim 15, wherein the thermoplastic of the outer layers and the core is polypropylene.

17. The component as claimed in claim 1, wherein the component has a thickness in the range of 5 to 25 mm.

18. The component as claimed in claim 1, wherein at least one of the outer layers is a woven outer layer.

19. The component as claimed in claim 18, wherein at least one of the outer layers is a woven polypropylene outer layer.

20. A cargo management system including at least one sandwich-type, structural, composite component having at least one hingedly connected portion which pivots with reduced or eliminated hinge binding, each component comprising:
   a first and second outer layers and a core positioned between the first and second outer layers and having a plurality of cavities, wherein the first and second outer layers are bonded to the core by press molding and wherein elongated first and second interior portions of the component are locally crushed by the press molding to form a living hinge having a pivot axis and an elongated depression, respectively; and
   an elongated cut-out which extends completely through the component at the elongated depression to obtain a clearance between a first portion of the component hingedly connected to a second portion of the component by the living hinge wherein the living hinge and the clearance allow pivotal movement of the first portion between different use positions relative to the second portion with reduced or eliminated hinge binding during the pivotal movement about the pivot axis.

21. An automotive vehicle load floor including at least one sandwich-type, structural, composite component having at least one hingedly connected portion which pivots with reduced or eliminated hinge binding, each component comprising:
   first and second outer layers and a core positioned between the first and second outer layers and having a plurality of cavities, wherein the first and second outer layers are bonded to the core by press molding and wherein elongated first and second interior portions of the component are locally crushed by the press molding to form a living hinge having a pivot axis and an elongated depression, respectively; and
   an elongated cut-out which extends completely through the component at the elongated depression to obtain a clearance between a first portion of the component hingedly connected to a second portion of the component by the living hinge wherein the living hinge and the clearance allow pivotal movement of the first portion between different use positions relative to the second portion with reduced or eliminated hinge binding during the pivotal movement about the pivot axis.

* * * * *